(12) United States Patent
McDermott et al.

(10) Patent No.: US 11,325,009 B2
(45) Date of Patent: May 10, 2022

(54) GOLF BALL AND METHOD OF MAKING SAME

(71) Applicant: Acushnet Company, Fairhaven, MA (US)

(72) Inventors: Erin C. McDermott, Providence, RI (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 16/710,202

(22) Filed: Dec. 11, 2019

(65) Prior Publication Data

US 2021/0178229 A1   Jun. 17, 2021

(51) Int. Cl.
| | | |
|---|---|---|
| *A63B 37/06* | (2006.01) | |
| *A63B 37/00* | (2006.01) | |
| *C08L 23/22* | (2006.01) | |
| *C08K 5/098* | (2006.01) | |
| *C08K 3/22* | (2006.01) | |
| *C08K 3/30* | (2006.01) | |
| *C08K 5/00* | (2006.01) | |
| *C08K 5/14* | (2006.01) | |

(52) U.S. Cl.
CPC ...... *A63B 37/0064* (2013.01); *A63B 37/0033* (2013.01); *C08L 23/22* (2013.01); *C08K 5/0025* (2013.01); *C08K 5/098* (2013.01); *C08K 5/14* (2013.01); *C08K 2003/2296* (2013.01); *C08K 2003/3045* (2013.01)

(58) Field of Classification Search
CPC .................................................. A63B 37/005
USPC ......................................................... 473/371
See application file for complete search history.

(56) References Cited

U.S. PATENT DOCUMENTS

| | | |
|---|---|---|
| 4,260,536 A | 4/1981 | Yonezawa et al. |
| 4,852,884 A | 8/1989 | Sullivan |
| 6,120,390 A | 9/2000 | Dalton |
| 6,203,450 B1 | 3/2001 | Bradley et al. |
| 6,241,626 B1 | 6/2001 | Sullivan et al. |
| 6,254,495 B1 | 7/2001 | Nakamura et al. |
| 6,309,314 B1 | 10/2001 | Sullivan et al. |
| 6,394,915 B1 | 5/2002 | Nesbitt |
| 6,695,718 B2 | 2/2004 | Nesbitt |
| 6,747,099 B1 * | 6/2004 | Novits ................ C08K 5/0025 525/330.4 |
| 6,855,070 B2 | 2/2005 | Hogge et al. |
| 7,723,427 B2 | 5/2010 | Higuchi et al. |
| 9,427,628 B2 * | 8/2016 | Sullivan ............ A63B 37/0074 |
| 9,644,089 B2 | 5/2017 | Ranbom et al. |
| 9,737,764 B2 * | 8/2017 | Sullivan ............ A63B 37/0045 |
| 10,316,154 B2 | 6/2019 | Palys et al. |
| 2008/0214324 A1 | 9/2008 | Nanba et al. |
| 2009/0124758 A1 | 5/2009 | Shindo et al. |
| 2012/0184396 A1 | 7/2012 | Sullivan et al. |
| 2013/0197138 A1 | 8/2013 | Nakajima et al. |
| 2016/0199701 A1 | 7/2016 | Watanabe et al. |
| 2016/0375313 A1 | 12/2016 | Binette et al. |
| 2017/0189765 A1 * | 7/2017 | Watanabe .......... A63B 37/0068 |
| 2017/0225042 A1 | 8/2017 | Nakajima et al. |
| 2017/0260343 A1 * | 9/2017 | Palys .................. C08K 5/3435 |
| 2017/0267832 A1 | 9/2017 | Pavlek et al. |
| 2017/0282016 A1 | 10/2017 | Nakajima et al. |
| 2017/0282017 A1 | 10/2017 | Yamazaki et al. |
| 2017/0355785 A1 | 12/2017 | Dluzneski et al. |
| 2017/0361170 A1 | 12/2017 | Ohira et al. |
| 2017/0368418 A1 | 12/2017 | Nakajima et al. |
| 2017/0368427 A1 | 12/2017 | Nakajima et al. |
| 2018/0093139 A1 | 4/2018 | Watanabe et al. |
| 2018/0126224 A1 | 5/2018 | Shindo et al. |
| 2019/0134467 A1 | 5/2019 | Shindo et al. |
| 2019/0256671 A1 | 8/2019 | Palys et al. |

* cited by examiner

*Primary Examiner* — Raeann Gorden
(74) *Attorney, Agent, or Firm* — Margaret C. Barker

(57) ABSTRACT

Golf ball comprising at least one layer that is comprised of a cured elastomeric composition comprising a mixture of an elastomeric composition and an organic peroxide-based curing composition; wherein the mixture at least partially contacts oxygen during curing.

17 Claims, No Drawings

GOLF BALL AND METHOD OF MAKING SAME

FIELD OF THE INVENTION

Durable golf balls incorporating elastomeric layer composition(s) that do not exhibit inhibited cure when contacting oxygen during molding, yet possess and produce desirable golf ball properties and playing characteristics.

BACKGROUND OF THE INVENTION

Today, both professional and amateur golfers alike use multi-piece, solid golf balls. For example, in a two-piece solid golf ball construction, a solid core is typically protected by a cover. The core is often made of a natural or synthetic rubber such as polybutadiene, styrene butadiene, or polyisoprene. In turn, the cover may be formed from of a variety of materials such as ethylene acid copolymer ionomers, polyamides, polyesters, polyurethanes, and/or polyureas.

Three-piece, four-piece, and even five-piece golf balls became more popular with the development of manufacturing technologies for efficiently producing same. Multi-layered cores may be comprised, for example, of an inner core containing a relatively soft and resilient material, surrounded by an outer core layer made of a harder and more rigid material. This "dual-core" sub-assembly is then encapsulated by at least one layer such as single or multi-layered cover layer, and optionally one or more intermediate layers to complete the golf ball construction.

Meanwhile, golf ball manufacturers pre-select the materials for each layer to target and impart desirable improved golf ball playing/performance properties/characteristics cost effectively. Currently, a broad range of options are available for strategically incorporating and coordinating layers within each golf ball construction.

In this regard, one very important consideration and goal is to manufacture a golf ball that possesses good durability. Poor golf ball durability typically becomes evident during or after play when failures such as cuts, cracks or other fractures appear on the outer surface of the cover of a golf ball or when delamination occurs between layers. A golf ball is subjected to the great force and impact of a club face striking the golf ball, which necessitates that any suitable golf ball material be quite cut or tear resistant. Meanwhile, however, players generally enjoy a golf ball having soft feel, and therefore, the challenge remains to discover and produce compositions that impart excellent durability to the finished golf ball and deliver the maximum performance for golfers of all skill levels without sacrificing that soft feel.

A number of elastomeric polymers, such as polybutadiene, natural rubber, styrene butadiene rubber (hereafter "SBR") and polyisoprene, have been used in fabricating golf ball cores. Today, golf ball cores are predominantly made of polybutadiene which is typically cured using organic peroxide systems. High heat causes failure of the peroxide bond, and permits it to cleave and form the radicals which further the crosslinking reaction. Compared with sulfur curing systems, peroxide curing systems display greater heat stability, better compression set, and ability to achieve vulcanization without using ingredients that are known to be harmful or produce an inferior resulting core/golf ball.

Unfortunately, with conventional peroxide cure systems, cure of rubber/elastomeric compounds can be inhibited by oxygen becoming trapped in the mold unless a high level of coagent is added into the formulation to prevent it. Without the coagent, oxygen undesirably reacts with elastomer radicals formed, and depolymerizes the rubber/elastomer. The result is incomplete cure of the rubber/elastomeric compound which can cause the material to stick in the mold or tear during demolding and therefore can result in a golf ball displaying poor durability. Additionally, adding a low level of peroxide and a high level of coagent to address this problem complicates the curing process and increases the cost of golf ball manufacturing.

Accordingly, there is a continued need to develop golf balls incorporating elastomeric compositions that can be cured using peroxide curing systems and ingredients which will not initiate inhibited cure in the absence of coagent. Such golf balls and formulations, if meanwhile producible within existing golf ball manufacturing processes/systems without sacrificing desired and required physical, mechanical and adhesive properties for golf ball materials, would be particularly cost-effective and useful. Golf balls of the invention and methods of making same address and solve these needs.

SUMMARY OF THE INVENTION

Golf balls of the invention and the methods of making same cost effectively incorporate durable elastomeric compositions that possess/display good physical and mechanical properties and meanwhile can contact oxygen while being peroxide-cured without the need to include additional amounts of coagent in the elastomeric composition formulation for the purpose of preventing inhibited cure. In one embodiment, a golf ball of the invention includes at least one layer comprised of a cured elastomeric composition comprising a mixture of an elastomeric composition and an organic peroxide-based curing composition; wherein the mixture at least partially contacts oxygen during curing.

In one specific embodiment, a golf ball of the invention comprises a core and a cover; wherein the core has a geometric center and an outer surface, a diameter of from about 1.53 inches to about 1.55 inches and includes the cured elastomeric composition comprising a mixture of an elastomeric composition and an organic peroxide-based curing composition.

In particular embodiments, the elastomeric composition is selected from the group consisting of: natural rubber, polybutadiene, polyisoprene, ethylene propylene rubber, ethylene-propylene-diene rubber, styrene-butadiene rubber, butyl rubber, halobutyl rubber, polyurethane rubber, polyurea rubber, acrylonitrile butadiene rubber, polychloroprene, alkyl acrylate rubber, chlorinated isoprene rubber, acrylonitrile chlorinated isoprene rubber, polyalkenamer, and combinations thereof.

In specific embodiments, the organic peroxide-based curing composition comprises at least one organic peroxide and at least one compound selected from one of three additive groups: i)bis-maleimides, tri-maleimides, and poly-maleimides, bis-citraconimides, tri-citraconimides, and poly-citraconimides, and p-phenylenediamine-based antiozonants, sulfur-containing accelerators, polysulfide polymers, and combinations thereof; ii)amino acids, folic acid, organic secondary amines, and combinations thereof; or iii)sulfur-containing compounds; organophosphite compounds; hindered amine light stabilizer compounds; aliphatic allyl urethane compounds; or tri-blends of nitride-containing compound(s), quinone-containing compound(s), and sulfur-containing compound(s), wherein the tri-blend does not contain any bis-maleimide, tri-maleimide, and poly-maleimide, bis-citraconimide, tri-citraconimide, and poly-citraconimide.

In one specific embodiment, the elastomeric composition is comprised of: 100 phr polybutadiene; from about 10 phr to about 50 phr zinc diacrylate; from about 3 phr to about 25 phr zinc oxide; up to 25 phr barium sulfate; from about 0.0 phr to about 2.0 phr antioxidant; from about 0.1 phr to about 5.0 zinc pentachlorothiophenol; and the organic peroxide-based curing composition is included in the mixture in an amount of from about 0.25 phr to about 2.5 phr. In a different embodiment, the organic peroxide-based curing composition is included in the mixture in an amount of at most 2.5 phr.

In another specific embodiment, the cured elastomer composition may comprise a supplemental amount of organic peroxide in addition to an amount of organic peroxide contained in the organic peroxide-based curing composition such that a ratio of amount of organic peroxide-based curing composition to supplemental amount of organic peroxide is from about 7:1 to about 0.5:1.

In one embodiment, the polybutadiene may be mixed with up to about 10 phr of at least one other elastomer selected from the group consisting of a different polybutadiene rubber, natural rubber, styrene butadiene rubber, isoprene rubber, and combinations thereof.

In another embodiment, the elastomeric composition comprises polybutadiene and at least one different elastomer; wherein the polybutadiene present in the mixture in an amount greater than 40 wt % based on the total weight of elastomers contained in the mixture. For example, the at least one different elastomer may be selected from the group consisting of: polyisoprene, ethylene propylene rubber, styrene-butadiene rubber, styrenic block copolymer rubbers, polyalkenamers, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations thereof.

In some embodiments, the mixture may have an antioxidant to organic peroxide-based curing composition ratio of from about 0.30 to about 5.

In one embodiment, the mixture has a maximum cure temperature of less than 405° F. In another embodiment, the mixture has a maximum cure temperature of from about 290° F. to about 365° F. In yet another embodiment, the mixture has a maximum cure temperature of from 290° F. to about 335° F. In still another embodiment, the mixture has a maximum cure temperature of from 305° F.-320° F. In an alternative embodiment, the mixture has a maximum cure temperature of greater than 330° F.

In some embodiments, the mixture has a starting cure temperature of about 75° F.-150° F.

In one embodiment, the mixture has a total cure time of about 45 minutes or less. In another embodiment, the mixture has a total cure time of from about 35 minutes to about 45 minutes. In yet another embodiment, the mixture has a total cure time of greater than 25 minutes to about 35 minutes. In still another embodiment, the mixture has a total cure time of from about 10 minutes to about 30 minutes.

In one embodiment, the cured elastomeric composition has a compression set of up to about 30%. In another embodiment, the cured elastomeric composition has a compression set of 10% or less.

In a different embodiment, golf ball comprises a core, a cover and an intermediate layer disposed between the core and the cover; wherein the intermediate layer has a thickness of about 0.10 inches or less and comprises a cured elastomeric composition comprised of a mixture of an elastomeric composition and an organic peroxide-based curing composition; wherein the mixture at least partially contacts oxygen during curing. In one such embodiment, the cured elastomeric composition further comprises at least one additional organic peroxide selected from the group consisting of dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof.

In yet another embodiment, a golf ball of the invention comprises a core and at least one cover layer; the core comprised of an inner core and an outer core layer; the inner core having a diameter of about 1.25 inches or less and comprising a first cured elastomeric composition comprised of a mixture of a first elastomeric composition and an organic peroxide-based curing composition; wherein the mixture at least partially contacts oxygen during curing; and wherein the outer core layer comprises a second cured elastomeric composition. The second cured elastomeric composition may consist of a mixture of a second elastomeric composition and at least one organic peroxide selected from the group consisting of dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof.

Alternatively, the second cured elastomeric composition may consist of a mixture of a second elastomeric composition and an organic peroxide-based curing composition; wherein the mixture at least partially contacts oxygen during curing. Embodiments are also envisioned wherein either or both of the first and/or cured elastomeric composition(s) include both peroxide-based curing composition and at least one conventional organic peroxide such as dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof.

In one embodiment, the first elastomeric composition is different than the second elastomeric composition. In another embodiment, the first elastomeric composition is the same as the second elastomeric composition.

In a different embodiment, a golf ball of the invention comprises a hollow core comprised of a spherical inner core shell layer and having an outer surface, an inner surface, and an inner diameter to define a hollow center; wherein the shell layer is comprised of a cured elastomeric composition comprising a mixture of an elastomeric composition and an organic peroxide-based curing composition; wherein the mixture at least partially contacts oxygen within the hollow center during curing; and at least one layer is disposed about the hollow core. For example, the hollow center may have a diameter of about 0.51 to 1.1 inches, and the shell layer may have a surface hardness different than an inner surface hardness by about 3 to 25 Shore C.

A golf ball of the invention may also or alternatively comprise a vapor barrier layer that is disposed about a core, wherein the vapor barrier layer is provided about the core by one of spraying vapor barrier layer material about the core or dipping the core in the vapor barrier material and then air-cured about the core; wherein the core is comprised of a cured elastomeric composition comprising a mixture of an elastomeric composition and an organic peroxide-based curing composition; wherein the mixture at least partially contacts air during curing.

The present invention also relates to methods and systems for producing/making golf balls of the invention. In one embodiment, the entire golf ball may be manufactured within conventional golf ball molding systems yet superior golf balls can be produced even when air is trapped and/or released within the system and contacts the elastomeric compositions being molded and cured—which heretofore caused the aforementioned problems. Embodiments are also envisioned wherein at least one golf ball manufacturing step includes air curing the material of a golf ball layer.

In one embodiment, a method of the invention for making a golf ball of the invention comprises the steps of: providing an uncured core having a geometric center and an outer surface and comprised of a mixture of an elastomeric composition and an organic peroxide-based curing composition; and curing the mixture in the presence of oxygen such that the mixture at least partially contacts the oxygen during curing and produces a cured core having a diameter of from about 1.53 inches to about 1.55 inches.

In another embodiment, a method of making a golf ball of the invention comprises the steps of: providing an uncured inner core having a geometric center and an outer surface and comprised of a first mixture of a first elastomeric composition that comprises at least one first organic peroxide; curing the first elastomeric composition using at least one preselected temperature and duration; forming an uncured outer core layer comprised of a second mixture of a second elastomeric composition and an organic peroxide-based curing composition about the cured inner core; curing the second mixture while the second mixture at least partially contacts oxygen to produce a cured dual core wherein the outer core layer has a thickness of about 0.10 inches; and forming at least one layer about an outer surface of the dual core to produce a finished golf ball.

In yet another embodiment, a method of making a golf ball of the invention comprises the steps of: providing an uncured inner core having a geometric center and an outer surface and comprised of a first mixture of a first elastomeric composition and a first organic peroxide-based curing composition; curing the mixture while being at least partially contacted by oxygen to produce a cured inner core having a diameter of about 1.25 inches or less; forming an uncured outer core layer comprising a second mixture of a second elastomeric composition and a second organic peroxide-based curing composition about the inner core; and curing the second mixture while being at least partially contacted by oxygen to produce a cured dual core; and forming at least one layer about an outer surface of the cured dual core to produce a finished golf ball. One or both of the first and second peroxide-based curing composition may in some embodiments additionally include one or more conventional organic peroxide(s).

In a different embodiment, a method of making a golf ball of the invention comprises the steps of: providing an uncured inner core having a geometric center and an outer surface and comprised of a first mixture of a first elastomeric composition and a first organic peroxide-based curing composition; curing the mixture while being at least partially contacted by oxygen to produce a cured inner core having a diameter of about 1.25 inches or less; forming an uncured outer core layer comprising a second mixture of a second elastomeric composition and at least one organic peroxide selected from the group consisting of dicumyl peroxide; n-butyl-4,4-di(t-butylperoxy) valerate; 1,1-di(t-butylperoxy) 3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof; and curing the second mixture to produce a cured dual core; and forming at least one layer about an outer surface of the cured dual core to produce a finished golf ball.

DETAILED DESCRIPTION OF THE INVENTION

Advantageously, golf balls of the invention and the methods of making same cost effectively incorporate durable elastomeric compositions that possess/display good physical and mechanical properties and meanwhile can contact oxygen while being peroxide-cured without the need to include additional amounts of coagent in the elastomeric composition formulation for the purpose of preventing inhibited cure. Heretofore, oxygen becoming trapped in the mold during molding could undesirably react with elastomer radicals formed and depolymerizing the rubber/elastomer unless additional levels of coagent were added to the formulation to address insufficient cure notwithstanding amounts of coagent added for other purposes (such as to target and achieve the desired hardness of the resulting cured elastomer). In golf balls of the invention, the resulting completely cured rubber/elastomeric compound releases/demolds without sticking to the mold and/or tearing, and therefore, a reliably durable golf ball as described herein is produced by a method of the invention as also described herein. And air-curing elastomeric compositions of golf balls of the invention becomes a viable consideration/option.

Accordingly, in one embodiment, a golf ball of the invention comprises at least one layer comprising a cured elastomeric composition comprising a mixture of an elastomeric composition and an organic peroxide-based curing composition; wherein the mixture at least partially contacts oxygen during curing. In one specific embodiment, a golf ball of the invention comprises a core and a cover; wherein the core has a geometric center and an outer surface, a diameter of from about 1.53 inches to about 1.55 inches and includes the cured elastomeric composition comprising a mixture of an elastomeric composition and an organic peroxide-based curing composition.

In particular embodiments, the elastomeric composition is selected from the group consisting of: natural rubber, polybutadiene, polyisoprene, ethylene propylene rubber, ethylene-propylene-diene rubber, styrene-butadiene rubber, butyl rubber, halobutyl rubber, polyurethane rubber, polyurea rubber, acrylonitrile butadiene rubber, polychloroprene, alkyl acrylate rubber, chlorinated isoprene rubber, acrylonitrile chlorinated isoprene rubber, polyalkenamer, and combinations thereof.

In specific embodiments, the organic peroxide-based curing composition comprises at least one organic peroxide and at least one compound selected from one of three additive groups: i)bis-maleimides, tri-maleimides, and poly-maleimides, bis-citraconimides, tri-citraconimides, and poly-citraconimides, and p-phenylenediamine-based antiozonants, sulfur-containing accelerators, polysulfide polymers, and combinations thereof; ii)amino acids, folic acid, organic secondary amines, and combinations thereof; or iii)sulfur-containing compounds; organophosphite compounds; hindered amine light stabilizer compounds; aliphatic allyl urethane compounds; or tri-blends of nitride-containing compound(s), quinone-containing compound(s), and sulfur-containing compound(s), wherein the tri-blend does not contain any bis-maleimide, tri-maleimide, and poly-maleimide, bis-citraconimide, tri-citraconimide, and poly-citraconimide.

In one specific embodiment, the elastomeric composition is comprised of: 100 phr polybutadiene; from about 10 phr to about 50 phr zinc diacrylate; from about 3 phr to about 25 phr zinc oxide; up to 25 phr barium sulfate; from about 0.0 phr to about 2.0 phr antioxidant; from about 0.1 phr to about 5.0 zinc pentachlorothiophenol; and the organic peroxide-based curing composition is included in the mixture in an amount of from about 0.25 phr to about 2.5 phr. In a different embodiment, the organic peroxide-based curing composition is included in the mixture in an amount of at most 2.5 phr.

In another specific embodiment, the cured elastomer composition may comprise a supplemental amount of organic peroxide in addition to an amount of organic peroxide contained in the organic peroxide-based curing composition such that a ratio of amount of organic peroxide-based curing composition to supplemental amount of organic peroxide is from about 7:1 to about 0.5:1.

In one embodiment, the polybutadiene may be mixed with up to about 10 phr of at least one other elastomer selected from the group consisting of a different polybutadiene rubber, natural rubber, styrene butadiene rubber, isoprene rubber, and combinations thereof.

In another embodiment, the elastomeric composition comprises polybutadiene and at least one different elastomer; wherein the polybutadiene present in the mixture in an amount greater than 40 wt % based on the total weight of elastomers contained in the mixture. For example, the at least one different elastomer may be selected from the group consisting of: polyisoprene, ethylene propylene rubber, styrene-butadiene rubber, styrenic block copolymer rubbers, polyalkenamers, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations thereof.

In some embodiments, the mixture may have an antioxidant to organic peroxide-based curing composition ratio of from about 0.30 to about 5.

In one embodiment, the mixture has a maximum cure temperature of less than 405° F. In another embodiment, the mixture has a maximum cure temperature of from about 290° F. to about 365° F. In yet another embodiment, the mixture has a maximum cure temperature of from 290° F. to about 335° F. In still another embodiment, the mixture has a maximum cure temperature of from 305° F.-320° F. In an alternative embodiment, the mixture has a maximum cure temperature of greater than 330° F.

In some embodiments, the mixture has a starting cure temperature of about 75° F.-150° F.

In one embodiment, the mixture has a total cure time of about 45 minutes or less. In another embodiment, the mixture has a total cure time of from about 35 minutes to about 45 minutes. In yet another embodiment, the mixture has a total cure time of greater than 25 minutes to about 35 minutes. In still another embodiment, the mixture has a total cure time of from about 10 minutes to about 30 minutes.

In one embodiment, the cured elastomeric composition has a compression set of up to about 30%. In another embodiment, the cured elastomeric composition has a compression set of 10% or less.

In one specific embodiment, a golf ball of the invention comprises a core and a cover; wherein the core has a geometric center and an outer surface, a diameter of from about 1.53 inches to about 1.55 inches, and is comprised of a cured elastomeric composition comprising a mixture of an elastomeric composition and an organic peroxide-based curing composition; wherein the mixture at least partially contacts oxygen during curing.

In a different embodiment, golf ball comprises a core, a cover and an intermediate layer disposed between the core and the cover; wherein the intermediate layer has a thickness of about 0.10 inches or less and comprises a cured elastomeric composition comprised of a mixture of an elastomeric composition and an organic peroxide-based curing composition; wherein the mixture at least partially contacts oxygen during curing. In one such embodiment, the cured elastomeric composition further comprises at least one additional organic peroxide selected from the group consisting of dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof.

In yet another embodiment, a golf ball of the invention comprises a core and at least one cover layer; the core comprised of an inner core and an outer core layer; the inner core having a diameter of about 1.25 inches or less and comprising a first cured elastomeric composition comprised of a mixture of a first elastomeric composition and an organic peroxide-based curing composition; wherein the mixture at least partially contacts oxygen during curing; and wherein the outer core layer comprises a second cured elastomeric composition. The second cured elastomeric composition may consist of a mixture of a second elastomeric composition and at least one organic peroxide selected from the group consisting of dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof.

Alternatively, the second cured elastomeric composition may consist of a mixture of a second elastomeric composition and an organic peroxide-based curing composition; wherein the mixture at least partially contacts oxygen during curing. Embodiments are also envisioned wherein either or both of the first and/or cured elastomeric composition(s) include both peroxide-based curing composition and at least one conventional organic peroxide such as dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof.

In one embodiment, the first elastomeric composition is different than the second elastomeric composition. In another embodiment, the first elastomeric composition is the same as the second elastomeric composition.

In a different specific embodiment, a golf ball of the invention comprises a hollow core comprised of a spherical inner core shell layer and having an outer surface, an inner surface, and an inner diameter to define a hollow center; wherein the shell layer is comprised of a cured elastomeric composition comprising a mixture of an elastomeric composition and an organic peroxide-based curing composition; wherein the mixture at least partially contacts oxygen within the hollow center during curing; and at least one layer is disposed about the hollow core. For example, the hollow center may have a diameter of about 0.51 to 1.1 inches, and the shell layer may have a surface hardness different than an inner surface hardness by about 3 to 25 Shore C.

A golf ball of the invention may also or alternatively comprise a vapor barrier layer that is disposed about a core, wherein the vapor barrier layer is provided about the core by one of spraying vapor barrier layer material about the core or dipping the core in the vapor barrier material and then air-cured about the core; wherein the core is comprised of a cured elastomeric composition comprising a mixture of an elastomeric composition and an organic peroxide-based curing composition; wherein the mixture at least partially contacts air during curing.

In embodiments wherein the organic peroxide-based curing composition is the sole peroxide type included in the cured elastomeric composition (i.e., conventional peroxides are not included in the formulation), the prior need to combine the peroxide with a high level of coagents, to address problems resulting from contact with oxygen, is eliminated. Even in embodiments wherein at least some of the total amount of peroxide is a conventional peroxide, the required amount of coagent to be combined with the peroxide portion of the elastomer formulation is desirably significantly reduced.

Examples of conventional peroxide initiators include, but are not limited to, organic peroxides, such as dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; lauryl peroxide; benzoyl peroxide; and combinations thereof. Examples of suitable commercially available peroxides include, but are not limited to Perkadox® BC dicumyl peroxide, commercially available from Akzo Nobel, and Varox® peroxides, such as Varox® ANS benzoyl peroxide and Varox® 231 1,1-di(t-butylperoxy)3,3,5-trimethylcyclohexane, commercially available from RT Vanderbilt Company, Inc.

Some predetermined amount of coagent may be used to target and achieve the desired hardness of the resulting cured elastomer. In this regard, commonly used coagents include, for example, metal salts of unsaturated carboxylic acids; unsaturated vinyl compounds and polyfunctional monomers (e.g., trimethylolpropane trimethacrylate); maleimides (e.g., phenylene bismaleimide); and combinations thereof. Particular examples of suitable metal salts of unsaturated carboxylic acids include, but are not limited to, one or more metal salts of acrylates, diacrylates, methacrylates, and dimethacrylates, wherein the metal is selected from magnesium, calcium, zinc, aluminum, lithium, nickel, and sodium. In a particular embodiment, the coagent is selected from zinc salts of acrylates, diacrylates, methacrylates, dimethacrylates, and mixtures thereof. In another particular embodiment, the coagent is zinc diacrylate.

The amount of coagent added for this purpose can be, for example as follows. An inner core layer composition is a peroxide-cured rubber comprising from 0.25 to 1.50 phr of a peroxide initiator and is free of coagent, substantially free of coagent (i.e., <1 phr coagent), or includes a low level of coagent (e.g., 10 phr or less, or less than 10 phr, or 5 phr or less, or less than 5 phr, or 1 phr or less, or less than 1 phr.

Optionally, one or more activators can be included selected from metal oxides (e.g., zinc oxide and magnesium oxide), and fatty acids and salts of fatty acids (e.g., stearic acid, zinc stearate, oleic acid, and dibutyl ammonium oleate). Scorch retarder(s) can also optionally be included to prevent scorching of the rubber during processing before vulcanization. Suitable scorch retarders include, but are not limited to, salicylic acid, benzoic acid, acetylsalicylic acid, phthalic anhydride, sodium acetate, and N-cyclohexylthiophthalimide.

The present invention also relates to methods and systems for producing/making golf balls of the invention. In one embodiment, the entire golf ball may be manufactured within existing golf ball molding systems yet superior golf balls can be produced even when air is trapped and/or released within the system and contacts the elastomeric compositions being molded and cured—which heretofore caused the aforementioned problems unless high levels of coagent were added into the formulation. Embodiments are also envisioned wherein at least one golf ball manufacturing step includes air curing the material of a golf ball layer.

In one embodiment, a method of the invention for making a golf ball of the invention comprises the steps of: providing an uncured core having a geometric center and an outer surface and comprised of a mixture of an elastomeric composition and an organic peroxide-based curing composition; and curing the mixture in the presence of oxygen such that the mixture at least partially contacts the oxygen during curing and produces a cured core having a diameter of from about 1.53 inches to about 1.55 inches.

In another embodiment, a method of making a golf ball of the invention comprises the steps of: providing an uncured inner core having a geometric center and an outer surface and comprised of a first mixture of a first elastomeric composition that comprises at least one first organic peroxide; curing the first elastomeric composition using at least one preselected temperature and duration; forming an uncured outer core layer comprised of a second mixture of a second elastomeric composition and an organic peroxide-based curing composition about the cured inner core; curing the second mixture while the second mixture at least partially contacts oxygen to produce a cured dual core wherein the outer core layer has a thickness of about 0.10 inches; and forming at least one layer about an outer surface of the dual core to produce a finished golf ball.

In yet another embodiment, a method of making a golf ball of the invention comprises the steps of: providing an uncured inner core having a geometric center and an outer surface and comprised of a first mixture of a first elastomeric composition and a first organic peroxide-based curing composition; curing the mixture while being at least partially contacted by oxygen to produce a cured inner core having a diameter of about 1.25 inches or less; forming an uncured outer core layer comprising a second mixture of a second elastomeric composition and a second organic peroxide-based curing composition about the inner core; and curing the second mixture while being at least partially contacted by oxygen to produce a cured dual core; and forming at least one layer about an outer surface of the cured dual core to produce a finished golf ball. One or both of the first and second peroxide-based curing composition may in some embodiments additionally include one or more conventional organic peroxide(s).

In a different embodiment, a method of making a golf ball of the invention comprises the steps of: providing an uncured inner core having a geometric center and an outer surface and comprised of a first mixture of a first elastomeric composition and a first organic peroxide-based curing composition; curing the mixture while being at least partially contacted by oxygen to produce a cured inner core having a diameter of about 1.25 inches or less; forming an uncured outer core layer comprising a second mixture of a second elastomeric composition and at least one organic peroxide selected from the group consisting of dicumyl peroxide; n-butyl-4,4-di(t-butylperoxy) valerate; 1,1-di(t-butylperoxy) 3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof; and curing the second mixture to produce a cured dual core; and forming at least one layer about an outer surface of the cured dual core to produce a finished golf ball.

Examples of maximum curing temperatures over a curing duration of about 8-16 mins. include: less than 405° F.; or from about 290° F. to about 365° F.; or from 290° F. to about 335° F.; or greater than 330° F.; or from about 325° F. to about 350° F.; or about 290° F. to about 315° F.; or 305° F.-320° F. for about 18 mins.

A starting cure temperature can be, for example, about 75° F.-150° F., which can be raised over 1-5 mins. to about 240° F. and maintained for 25-30 mins. and then further raised over about 5-10 mins. to about 320-330° F. or to about 330-340° F. or to about 340-365° F., and then maintained for about 10-20 mins.

In one embodiment, at least one of the core layers is formed of a rubber composition comprising polybutadiene rubber material. More particularly, in one version, the ball contains a single inner core formed of the polybutadiene rubber composition. In a second version, the ball contains a dual-core comprising an inner core (center) and surrounding outer core layer.

In one version, the core is formed of a rubber composition comprising a rubber material such as, for example, polybutadiene, ethylene-propylene rubber, ethylene-propylene-diene rubber, polyisoprene, styrene-butadiene rubber, polyalkenamers, butyl rubber, halobutyl rubber, or polystyrene elastomers. For example, polybutadiene rubber compositions may be used to form the inner core (center) and surrounding outer core layer in a dual-layer construction.

In another version, the core may be formed from an ionomer composition comprising an ethylene acid copolymer containing acid groups such that greater than 70% of the acid groups are neutralized. These highly neutralized polymers (HNPs) also may be used to form at least one core layer in a multi-layered core construction. For example, a polybutadiene rubber composition may be used to form the center and a HNP composition may be used to form the outer core. Such rubber and HNP compositions may be as discussed herein.

In general, polybutadiene is a homopolymer of 1, 3-butadiene. The double bonds in the 1, 3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyllithium is used as a catalyst. Other catalysts include, but are not limited to, aluminum, boron, lithium, titanium, and combinations thereof. The catalysts produce polybutadiene rubbers having different chemical structures.

In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures.

A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEO-CIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

To form the core, the polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. In general, the concentration of polybutadiene rubber is about 45 to about 95 weight percent. Preferably, the rubber material used to form the core layer comprises at least 50% by weight, and more preferably at least 70% by weight, polybutadiene rubber.

The rubber compositions of this invention may be peroxide-cured without inhibiting cure. Suitable organic peroxides include, but are not limited to, dicumyl peroxide; n-butyl-4,4-di(t-butylperoxy) valerate; 1,1-di(t-butylperoxy) 3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel.

Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

Suitable co-agents, where desired, may include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates.

In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent.

Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used.

In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition.

The polybutadiene rubber material (base rubber) may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

For example, in one embodiment, the elastomer composition may comprise i) about 50% to about 95% by weight of a non-metallocene catalyzed polybutadiene rubber; and ii) about 5 to about 50% by weight of a metallocene-catalyzed polybutadiene rubber; wherein examples of suitable non-metallocene catalysts (may be referred to as Ziegler-Natta catalysts) include neodymium, nickel, cobalt, titanium, aluminum, boron, and alkyllithium-based catalysts, and combinations thereof; and examples of suitable metallocene catalysts are complexes based on metals such as cobalt, gadolinium, iron, lanthanum, neodymium, nickel, praseodymium, samarium, titanium, vanadium, zirconium; and combinations thereof.

The polymers, free-radical initiators, filler, cross-linking agents, and any other materials used in forming either the golf ball center or any of the core, in accordance with invention, may be combined to form a mixture by any type of mixing known to one of ordinary skill in the art. Suitable types of mixing include single pass and multi-pass mixing, and the like. The cross-linking agent, and any other optional additives used to modify the characteristics of the golf ball center or additional layer(s), may similarly be combined by any type of mixing.

A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

In one preferred embodiment, the entire core or at least one core layer in a multi-layered structure is formed of a rubber composition comprising a material selected from the group of natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

In golf balls of the invention, the organic peroxide-based curing composition as defined herein may be the sole peroxide-containing portion of the cured elastomer composition formulation; or alternatively, a supplemental amount of organic peroxide can be incorporated in the cured elastomer composition formulation in addition to the amount of peroxide contained in the peroxide-based curing composition. In fact, the cured elastomer composition formulation can include up to seven times more organic peroxide-based curing composition than supplemental organic peroxide. In different embodiments, however, the cured elastomer composition formulation can include up to 30% more supplemental organic peroxide than organic peroxide-based curing composition.

Thus, the cured elastomer composition may comprise the organic peroxide-based curing composition in an amount of from about 0.3 parts to about 3.5 parts per 100 parts elastomer. In alternative embodiments, the organic peroxide-based curing composition may be included in an amount of from about 0.3 parts to about 3.5 parts, or from about 0.3 parts to about 2.5 parts, or from about 0.3 parts to about 1.5 parts, or from about 0.3 parts to about 1.2 parts, or from about 0.3 parts to about 1.0 parts, or from about 0.3 parts to about 7.0 parts, or from about 0.3 parts to about 0.5 parts per 100 parts elastomer.

And in turn, the cured elastomer composition may further comprise a supplemental amount of organic peroxide in addition to an amount of organic peroxide contained in the organic peroxide-based curing composition such that a ratio of amount of organic peroxide-based curing composition to supplemental amount of organic peroxide is from about 7:1 to about 0.5:1, or from about 7:1 to about 1:1, or from about 7:1 to about 2:1, or from about 7:1 to about 3:1, or from about 7:1 to about 4:1, or from about 7:1 to about 5:1, or from about 7:1 to about 6:1.

Thirty non-limiting formulations are detailed in TABLES 1-8 below which would each produce a single core, an inner core or outer core layer comprised of cured elastomer composition.

TABLE 1

SINGLE CORE

| Ingredients (phr) | Ex 1 | Ex 2 | Ex 3 | Ex 4 | Ex 5 |
|---|---|---|---|---|---|
| polybutadiene | 100 | 100 | 100 | 100 | 100 |
| ZDA | 40 | 35 | 30 | 40 | 40 |
| ZnO | 5 | 5 | 5 | 5 | 5 |
| BaSO$_4$ | 9.8 | 11.7 | 13.6 | 14 | 14 |
| Luperox ® AIR ® XL* | 0.7 | 0.6 | 0.65 | 0.5 | 0.5 |
| Luperox ® AIR ® XL2* | 0.7 | 0.6 | 0.65 | 0.5 | 0.5 |
| Luperox ® AIR ® QC* | 0.88 | 0.70 | 0.70 | 0.53 | 0.53 |
| Luperox ® AIR ®HT* | 0.9 | 0.8 | 0.8 | 0.7 | 0.7 |
| Luperox ® AIR ®XL80* | 0.7 | 0.6 | 0.65 | 0.5 | 0.5 |
| PERKADOX ® BC-FF** | 1.0 | 0.8 | 0.8 | 0.6 | 0.6 |
| VANOX ® MBPC (antioxidant) | 0.6 | 0.5 | 0.4 | 0.2 | 0.2 |
| ZnPCTP | 0.5 | 0.5 | 0.5 | 0.5 | 0.5 |
| Regrind | 17 | 15 | 20 | — | — |
| antioxidant/ initiator ratio | 0.6 | 0.63 | 0.5 | — | — |
| Cure Temp. (° F.) | 350 | 350 | 350 | 350 | 350 |
| Cure Time T$_1$ (min.) | 11 | 11 | 15 | 15 | 15 |
| Properties | — | — | — | — | — |
| diameter (in.) | 1.530 | 1.530 | 1.530 | — | — |
| Atti compression | 75 | 65 | 60 | — | — |
| COR @ 125 ft/s | 0.807 | 0.798 | 0.782 | — | — |

*Luperox ® AIR ® XL, Luperox ® AIR ® XL2, Luperox ® AIR ®QC, Luperox ® AIR ®XL80, Luperox ® AIR ®HT, are examples of suitable organic peroxide-based curing compositions, available from Arkema, Inc.
**PERKADOX BC-FF is dicumyl peroxide (99%-100% active) available from Akzo Nobel.

Solid cores comprised of cured elastomeric composition may be made using any suitable conventional technique such as, for example, compression molding. Typically, the inner core is formed by compression molding a slug of the uncured or lightly cured polybutadiene rubber material into a spherical structure. The outer core, which surrounds the inner core, is formed by molding a composition over the inner core. Then, the intermediate and/or cover layers are applied. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

TABLE 2

DUAL CORE FORMULATIONS

| Formulation | Ranges Inner Core | | Ranges Outer Core | |
|---|---|---|---|---|
| (phr) | A | B | C | D |
| Polybutadiene | 100 | 100 | 85-100 | 85-100 |
| ZDA | 25-35 | 30-40 | 25-40 | 25-40 |
| ZnO | 5-10 | 5-10 | 5-10 | 5-10 |
| BaSO$_4$ | Vary to achieve targeted specific gravity | | | |
| Luperox ® AIR ® XL | 0.3-2.5 | 0.3-3 | 0.3-3 | 0.3-3 |
| Luperox ® AIR ® XL2 | 0.3-2.5 | 0.3-3 | 0.3-3 | 0.3-3 |

TABLE 2-continued

DUAL CORE FORMULATIONS

| Formulation | Ranges Inner Core | | Ranges Outer Core | |
|---|---|---|---|---|
| (phr) | A | B | C | D |
| Luperox ® AIR ® QC | 0.3-2 | 0.3-2.5 | 0.3-2.5 | 0.3-2.5 |
| Luperox ® AIR ®HT | 0.6-3 | 0.6-3.5 | 0.6-3.5 | 0.6-3.5 |
| Luperox ® AIR ®XL80 | 0.3-2 | 0.3-3 | 0.3-3 | 0.3-3 |
| TRIGONOX ®265 | 0.5-1.0 | 0.5-1.2 | 0.5-1.2 | 0 |
| PERKADOX BC-FF | — | — | 0 | 0.5-1.5 |
| VANOX ®MBPC (Antioxidant) | 0-1.0 | 0-1.0 | 0.2-1.2 | 0 |
| Trans polyisoprene | 0-15 | 0-15 | 0-15 | 0-15 |
| ZnPCTP | 0-3 | 0-3 | 0-3 | 0-3 |
| Regrind | 10-30 | 10-30 | 10-30 | 10-30 |
| antioxidant/initiator ratio | 0-2.5 | 0-4.8 | 0.33-4.8 | — |
| Cure Temp. (° F.) | 325-350 | 290-315 | 100-150 | 100-150 |
| Cure Time T$_1$ (min) | 10-15 | 15-20 | 3-7 | 3-7 |
| Cure Temp. (° F.) | — | — | 290-340 | 330-350 |
| Cure Time T$_2$ (min) | — | — | 5-10 | 5-10 |
| Layer Diameter/Thickness (in) | 0.75-1.25 | 0.75-1.25 | 0.14-0.415 | 0.14-0.415 |
| Atti compression | — | — | 75-100 | 75-100 |
| COR @ 125 ft/s | — | — | 0.795 | 0.795 |

***TRIGONOX ®265 is a mixture of 1,1-di(t-butylperoxy)-3,3,5-trimethycyclohexane and di(2-t-butylperoxyisopropyl)benzene 50% active on an inert carrier available from Akzo Nobel.

TABLE 3

DUAL CORE FORMULATIONS

| Formulation | Ranges | Ranges Outer Core | |
|---|---|---|---|
| (phr) | Inner Core | A | B |
| Polybutadiene | 100 | 85-100 | 85-100 |
| ZDA | 35-45 | 39-45 | 35-42 |
| ZnO | 5-10 | 5-10 | 5-10 |
| BaSO$_4$ | Vary to achieve targeted specific gravity | | |
| Luperox ® AIR ® XL | 0.3-3 | 0.5-3 | 0.3-3 |
| Luperox ® AIR ® XL2 | 0.3-3 | 0.5-3 | 0.3-3 |
| Luperox ® AIR ® QC | 0.3-2.5 | 0.5-2.5 | 0.3-2.5 |
| Luperox ® AIR ®HT | 0.6-3.5 | 0.8-3.5 | 0.6-3.5 |
| Luperox ® AIR ®XL80 | 0.3-3 | 0.5-3 | 0.3-3 |
| TRIGONOX ® 265 | 0 | 0.8-1.5 | 0.6-1.2 |
| PERKADOX ® BC-FF | 0.6-1.2 | — | — |
| VANOX ® MBPC (Antioxidant) | 0 | 0.2-1.0 | 0.2-1.0 |
| Trans polyisoprene | 0-15 | 0-15 | 0-15 |
| ZnPCTP | 0-3 | 0-3 | 0-3 |
| Regrind | 10-30 | 10-30 | 10-30 |
| antioxidant/initiator ratio | — | 0.27-2.5 | 0.33-3.33 |
| Cure Temp. (° F.) | 340° F.-365° F. | 100° F.-150° F. | 100° F.-150° F. |
| Cure Time T$_1$ (min) | 10-15 | 2-7 | 2-7 |
| Cure Temp. (° F.) | — | 320° F.-350° F. | 300° F.-350° F. |
| Cure Time T$_2$ (min) | — | 10-15 | 15-20 |
| Layer Diameter/Thickness (in) | 0.75-1.25 | 0.14-0.415 | 0.14-0.415 |
| Atti compression | — | 80-100 | 90-120 |
| COR @ 125 ft/s | — | 0.795-0.820 | 0.800-0.825 |

TABLE 4

DUAL CORE CONSTRUCTIONS

| Formulation (phr) | Ranges Inner Core | Ranges Outer Core A | Ranges Outer Core B |
|---|---|---|---|
| Polybutadiene | 100 | 85-100 | 85-100 |
| ZDA | 35-45 | 39-45 | 35-42 |
| ZnO | 5-10 | 5-10 | 5-10 |
| $BaSO_4$ | Vary to achieve targeted specific gravity | | |
| Luperox ® AIR ® XL | 0.3-3 | 0.5-3 | 0.3-3 |
| Luperox ® AIR ® XL2 | 0.3-3 | 0.5-3 | 0.3-3 |
| Luperox ® AIR ® QC | 0.3-2.5 | 0.5-2.5 | 0.3-2.5 |
| Luperox ® AIR ®HT | 0.6-3.5 | 0.8-3.5 | 0.6-3.5 |
| Luperox ® AIR ®XL80 | 0.3-3 | 0.5-3 | 0.3-3 |
| TRIGONOX ®265 | 0.5-1.0 | 0.8-1.5 | 0.6-1.2 |
| VANOX ® MBPC (Antioxidant) | 0-1.0 | 0.2-1.0 | 0.2-1.0 |
| Trans polyisoprene | 0-15 | 0-15 | 0-15 |
| ZnPCTP | 0-3 | 0-3 | 0-3 |
| Regrind | 10-30 | 10-30 | 10-30 |
| antioxidant/ initiator ratio | 0-2.5 | 0.27-2.5 | 0.33-3.33 |
| Cure Temp. (° F.) | 325-350 | 100° F.-150° F. | 100° F.-150° F. |
| Cure Time $T_1$ (min) | 10-15 | 2-7 | 2-7 |
| Cure Temp. (° F.) | — | 320° F.-350° F. | 300° F.-320° F. |
| Cure Time $T_2$ (min) | — | 10-15 | 15-20 |
| Layer Diameter/ Thickness (in) | 0.75-1.25 | 0.14-0.415 | 0.14-0.415 |
| Atti compression | | 80-100 | 90-120 |
| COR @ 125 ft/s | | 0.795-0.820 | 0.800-0.825 |

TABLE 5

DUAL CORE CONSTRUCTIONS

| Formulation (phr) | Ranges Inner Core | Ranges Outer Core A | Ranges Outer Core B | Ranges Outer Core C |
|---|---|---|---|---|
| Polybutadiene | 100 | 100 | 100 | 100 |
| ZDA | 40-50 | 30-45 | 30-45 | 30-45 |
| ZnO | 5-10 | 5-10 | 5-10 | 5-10 |
| $BaSO_4$ | Vary to achieve targeted specific gravity | | | |
| Luperox ® AIR ® XL | 0.3-2.5 | 0.3-2.5 | 0.3-2 | 0.3-2.5 |
| Luperox ® AIR ® XL2 | 0.3-2.5 | 0.3-2.5 | 0.3-2 | 0.3-2.5 |
| Luperox ® AIR ® QC | 0.3-2 | 0.3-2 | 0.3-1.5 | 0.3-2 |
| Luperox ® AIR ®HT | 0.6-3 | 0.6-3 | 0.6-2.5 | 0.6-3 |
| Luperox ® AIR ®XL80 | 0.3-2 | 0.3-2.5 | 0.3-2 | 0.3-2 |
| TRIGONOX ®265 | 0.5-1.2 | 0 | 0.2-0.8 | 0.5-1.2 |
| PERKADOX ® BC-FF | — | 0.5-1.0 | 0-1.0 | 0 |
| VANOX ® MBPC (Antioxidant) | 0.2-1.2 | 0 | 0-1.0 | 0.2-1.2 |
| Trans polyisoprene | 0-15 | 0-15 | 0-15 | 0-15 |
| ZnPCTP | 0-3 | 0-3 | 0-3 | 0-3 |
| Regrind | 10-30 | 10-30 | 10-30 | 10-30 |
| antioxidant/ initiator ratio | 0.33-4.8 | 0 | 0-10 | 0.33-4.8 |
| Cure Temp. (° F.) | 290° F.-315° F. | 100° F.-150° F. | 100° F.-150° F. | 100° F.-150° F. |
| Cure Time $T_1$ (min) | 15-25 | 1-3 | 1-3 | 1-3 |
| Cure Temp. (° F.) | 290° F.-315° F. | 335° F.-365° F. | 335° F.-365° F. | 335° F.-365° F. |
| Cure Time $T_2$ (min) | — | 9-14 | 9-14 | 9-14 |
| Layer Diameter/ Thickness (in) | 0.75-1.25 | 0.14-0.415 | 0.14-0.415 | 0.14-0.415 |
| Atti compression | — | 75-100 | 75-100 | 75-100 |
| COR @ 125 ft/s | — | 0.795-0.825 | 0.795-0.825 | 0.795-0.825 |

TABLE 6

DUAL CORE CONSTRUCTIONS

| Formulation (phr) | Ranges Inner Core | Ranges Outer Core A | B | C |
|---|---|---|---|---|
| Polybutadiene | 100 | 85-100 | 85-100 | 85-100 |
| ZDA | 25-35 | 30-45 | 30-45 | 30-45 |
| ZnO | 5-10 | 5-10 | 5-10 | 5-10 |
| $BaSO_4$ | Vary to achieve targeted specific gravity | | | |
| Luperox ® AIR ® XL | 0.3-2.5 | 0.3-2 | 0.3-2 | 0.3-2.5 |
| Luperox ® AIR ® XL2 | 0.3-2.5 | 0.3-2 | 0.3-2 | 0.3-2.5 |
| Luperox ® AIR ® QC | 0.3-2 | 0.3-1.5 | 0.3-1.5 | 0.3-2 |
| Luperox ® AIR ®HT | 0.6-3 | 0.6-2.5 | 0.6-2.5 | 0.6-3 |
| Luperox ® AIR ®XL80 | 0.3-2 | 0.3-2 | 0.3-2 | 0.3-2 |
| TRIGONOX ® 265 | 0.5-1.2 | 0 | 0.2-0.8 | 0.5-1.2 |
| PERKADOX ® BC-FF | — | 0.5-1.0 | 0-1.0 | 0 |
| VANOX ® MBPC (Antioxidant) | 0.2-1.2 | 0 | 0-1.0 | 0.2-1.2 |
| Trans polyisoprene | 0-15 | 0-15 | 0-15 | 0-15 |
| ZnPCTP | 0-3 | 0-3 | 0-3 | 0-3 |
| Regrind | 10-30 | 10-30 | 10-30 | 10-30 |
| antioxidant/initiator ratio | 0.33-4.8 | 0 | 0-10 | 0.33-4.8 |
| Cure Temp. (° F.) | 285° F.-310° F. | 100° F.-150° F. | 100° F.-150° F. | 100° F.-150° F. |
| Cure Time $T_1$ (min) | 15-20 | 1-3 | 1-3 | 1-3 |
| Cure Temp. (° F.) | 285° F.-310° F. | 335° F.-365° F. | 335° F.-365° F. | 335° F.-365° F. |
| Cure Time $T_2$ (min) | — | 9-14 | 9-14 | 9-14 |
| Layer Diameter/Thickness (in) | 0.25-1.25 | 0.14-0.415 | 0.14-0.415 | 0.14-0.415 |
| Atti compression | — | 75-100 | 75-100 | 75-100 |
| COR @ 125 ft/s | — | 0.795-0.825 | 0.795-0.825 | 0.795-0.825 |

TABLE 7

DUAL CORE CONSTRUCTIONS

| Formulation (phr) | Ranges Inner Core | Ranges Outer Core D | E |
|---|---|---|---|
| Polybutadiene | 100 | 100 | 100 |
| ZDA | 25-35 | 25-35 | 25-35 |
| ZnO | 5-10 | 5-10 | 5-10 |
| $BaSO_4$ | Vary to achieve targeted specific gravity | | |
| Luperox ® AIR ® XL | 0.3-2 | 0.5-3 | 0.3-3 |
| Luperox ® AIR ® XL2 | 0.3-2 | 0.5-3 | 0.3-3 |
| Luperox ® AIR ® QC | 0.3-1.5 | 0.5-2.5 | 0.3-2.5 |
| Luperox ® AIR ®HT | 0.6-2.5 | 0.8-3.5 | 0.6-3.5 |
| Luperox ® AIR ®XL80 | 0.3-2 | 0.5-3 | 0.3-3 |
| TRIGONOX ® 265 | 0.5-1.2 | 0 | 0 |
| PERKADOX ® BC-FF | — | 0.5-1.5 | 0.5-1.5 |
| VANOX ® MBPC (Antioxidant) | 0.2-1.2 | 0-0.5 | 0-1.0 |
| Trans polyisoprene | 0-15 | 0-15 | 0-15 |
| ZnPCTP | 0-3 | 0-3 | 0-3 |
| Regrind | 10-30 | 10-30 | 10-30 |
| antioxidant/initiator ratio | 0.33-4.8 | 0-1.0 | 0-2.0 |
| Cure Temp. (° F.) | 285° F.-310° F. | 330-360 | 330-360 |
| Cure Time $T_1$ (min) | 15-20 | 8-15 | 8-15 |
| Layer Diameter/Thickness (in) | 0.25-1.25 | | |

TABLE 8

INNER CORE FORMULATIONS

| Formulation (phr) | Rubber Compositions R1 | R2 | R3 | R4 |
|---|---|---|---|---|
| Polybutadiene | 100 | 100 | 100 | 100 |
| Zinc Oxide | 5 | 30 | 5 | 30 |
| zinc diacrylate (ZDA) | 35 | — | 31 | 5 |
| Luperox ® AIR ® XL | 0.3 | 0.3 | 0.4 | 0.3 |
| Luperox ® AIR ® XL2 | 0.3 | 0.3 | 0.4 | 0.3 |
| Luperox ® AIR ® QC | 0.3 | 0.3 | 0.4 | 0.3 |
| Luperox ® AIR ®HT | 0.6 | 0.6 | 0.7 | 0.6 |

TABLE 8-continued

INNER CORE FORMULATIONS

| Formulation | Rubber Compositions | | | |
|---|---|---|---|---|
| (phr) | R1 | R2 | R3 | R4 |
| Luperox ® AIR ®XL80 | 0.3 | 0.3 | 0.4 | 0.3 |
| Dicumyl Peroxide | 0.5 | 0.4 | — | 0.4 |
| Trigonox ® 265 | — | — | 1.0 | — |
| Antioxidant | — | — | 0.4 | — |
| Zinc Salt of Pentachlorothiophenol (ZnPCTP) | 0.5 | 0.5 | 0.5 | |
| Diphenyldisulfide | — | — | — | 0.5 |
| Barium Sulfate | vary | vary | vary | vary |

Additionally, property gradients can be created between golf ball layers by varying the type and/or relative amounts of organic peroxide composition used in two given layers.

Furthermore, while the examples above include the inventive mixture in one or more core layers, embodiments are indeed envisioned wherein inventive mixture is included in one or more outer golf ball layer(s)—either in addition to or in lieu of the core layers. It is also envisioned that the inventive mixture may be used in blends with other golf ball materials as permitted. Thus, any golf ball layer may at least in part comprise an inventive golf ball layer of mixture defined herein.

Thermoplastic polyurethanes are particularly desirable as an outer cover layer material for at least the reasons described further above. Non-limiting examples of suitable thermoplastic polyurethanes include TPUs sold under the tradenames of Texin® 250, Texin® 255, Texin® 260, Texin® 270, Texin®950U, Texin® 970U, Texin®1049, Texin®990DP7-1191, Texin® DP7-1202, Texin®990R, Texin®993, Texin®DP7-1049, Texin® 3203, Texin® 4203, Texin® 4206, Texin® 4210, Texin® 4215, and Texin® 3215, each commercially available from Covestro LLC, Pittsburgh Pa.; Estane® 50 DT3, Estane®58212, Estane®55DT3, Estane®58887, Estane®EZ14-23A, Estane®ETE 50DT3, each commercially available from Lubrizol Company of Cleveland, Ohio; and Elastollan®WY1149, Elastollan®1154D53, Elastollan®1180A, Elastollan®1190A, Elastollan®1195A, Elastollan®1185AW, Elastollan®1175AW, each commercially available from BASF; Desmopan® 453, commercially available from Bayer of Pittsburgh, Pa., and the E-Series TPUs, such as D 60 E 4024 commercially available from Huntsman Polyurethanes of Germany.

In general, polyurethanes contain urethane linkages formed by reacting an isocyanate group (—N═C═O) with a hydroxyl group (OH). The polyurethanes are produced by the reaction of a multi-functional isocyanate (NCO—R—NCO) with a long-chain polyol having terminal hydroxyl groups (OH—OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

By the term, "isocyanate compound" as used herein, it is meant any aliphatic or aromatic isocyanate containing two or more isocyanate functional groups. The isocyanate compounds can be monomers or monomeric units, because they can be polymerized to produce polymeric isocyanates containing two or more monomeric isocyanate repeat units. The isocyanate compound may have any suitable backbone chain structure including saturated or unsaturated, and linear, branched, or cyclic. By the term, "polyamine" as used herein, it is meant any aliphatic or aromatic compound containing two or more primary or secondary amine functional groups. The polyamine compound may have any suitable backbone chain structure including saturated or unsaturated, and linear, branched, or cyclic. The term "polyamine" may be used interchangeably with amine-terminated component. By the term, "polyol" as used herein, it is meant any aliphatic or aromatic compound containing two or more hydroxyl functional groups. The term "polyol" may be used interchangeably with hydroxy-terminated component.

Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the thermoplastic material softens when exposed to heat and returns to its original condition when cooled. On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

Aromatic polyurethanes can be prepared in accordance with this invention and these materials are preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and cut/shear-resistance.

Aliphatic polyurethanes also can be prepared in accordance with this invention and these materials are preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), and homopolymers and copolymers and blends thereof. Particularly suitable multi-functional isocyanates include trimers of HDI or $H_{12}$ MDI, oligomers, or other derivatives thereof. The resulting polyurethane generally has good light and thermal stability.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG) which is particularly preferred, polyethylene propylene glycol, polyoxypropylene glycol, and mixtures thereof. The hydrocarbon chain can have saturated or unsaturated bonds and substituted or unsubstituted aromatic and cyclic groups.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

There are two basic techniques that can be used to make the polyurethanes: a) one-shot technique, and b) prepolymer technique. In the one-shot technique, the diisocyanate, polyol, and hydroxyl-terminated chain-extender (curing agent) are reacted in one step. On the other hand, the prepolymer technique involves a first reaction between the diisocyanate and polyol compounds to produce a polyurethane prepolymer, and a subsequent reaction between the prepolymer and hydroxyl-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate groups to hydroxyl groups is preferably in the range of about 1.00:1.00 to about 1.10:1.00. In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single chain-extender or blend of chain-extenders as described further below. As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. In general, thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio A catalyst may be employed to promote the reaction between the isocyanate and polyol compounds for producing the prepolymer or between prepolymer and chain-extender during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; mono-ethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 2, 2'-(1,4-phenylenedioxy)diethanol, 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenyl-methane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"); and mixtures thereof. One particularly suitable amine-terminated chain-extending agent is Ethacure 300™ (dimethylthiotoluenediamine or a mixture of 2,6-diamino-3,5-dimethylthiotoluene and 2,4-diamino-3,5-dimethylthio-toluene.) The amine curing agents used as chain extenders normally have a cyclic structure and a low molecular weight (250 or less).

When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

More particularly, when the polyurethane prepolymer is reacted with hydroxyl-terminated curing agents during the chain-extending step, as described above, the resulting composition is essentially a pure polyurethane composition containing urethane linkages having the following general structure:

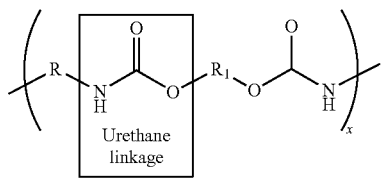

where x is the chain length, i.e., about 1 or greater, and R and $R_1$ are straight chain or branched hydrocarbon chain having about 1 to about 20 carbons.

However, when the polyurethane prepolymer is reacted with an amine-terminated curing agent during the chain-extending step, any excess isocyanate groups in the prepolymer will react with the amine groups in the curing agent and create urea linkages having the following general structure:

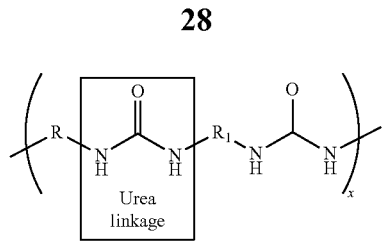

where x is the chain length, i.e., about 1 or greater, and R and $R_1$ are straight chain or branched hydrocarbon chain having about 1 to about 20 carbons.

The polyurethane compositions used to form the cover layer may contain other polymer materials including, for example: aliphatic or aromatic polyurethanes, aliphatic or aromatic polyureas, aliphatic or aromatic polyurethane/urea hybrids, olefin-based copolymer ionomer compositions, polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, available from Arkema Inc; cross-linked trans-polyisoprene and blends thereof; polyester-based thermoplastic elastomers, such as Hytrel®, available from DuPont; polyurethane-based thermoplastic elastomers, such as Elastollan®, available from BASF; polycarbonate/polyester blends such as Xylex®, available from SABIC Innovative Plastics; maleic anhydride-grafted polymers such as Fusabond®, available from DuPont; and mixtures of the foregoing materials.

In addition, the polyurethane compositions may contain fillers, additives, and other ingredients that do not detract from the properties of the final composition. These additional materials include, but are not limited to, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives. Other suitable additives include antioxidants, stabilizers, softening agents, plasticizers, including internal and external plasticizers, impact modifiers, foaming agents, density-adjusting fillers, reinforcing materials, compatibilizers, and the like. Some examples of useful fillers include zinc oxide, zinc sulfate, barium carbonate, barium sulfate, calcium oxide, calcium carbonate, clay, tungsten, tungsten carbide, silica, and mixtures thereof. Rubber regrind (recycled core material) and polymeric, ceramic, metal, and glass microspheres also may be used. Generally, the additives will be present in the composition in an amount between about 1 and about 70 weight percent based on total weight of the composition depending upon the desired properties.

Thermoplastic polyurea compositions are typically formed by reacting the isocyanate blend and polyamines at a 1:1 stoichiometric ratio. The polyurea prepolymer can be chain-extended by reacting it with a single curing agent or blend of curing agents. In general, the prepolymer can be reacted with hydroxyl-terminated curing agents, amine-terminated curing agents, or mixtures thereof. The curing agents extend the chain length of the prepolymer and build-up its molecular weight. Normally, the prepolymer and curing agent are mixed so the isocyanate groups and hydroxyl or amine groups are mixed at a 1.05:1.00 stoichiometric ratio.

A catalyst may be employed to promote the reaction between the isocyanate and polyamine compounds for producing the prepolymer or between prepolymer and curing agent during the chain-extending step. Preferably, the catalyst is added to the reactants before producing the prepolymer. Suitable catalysts include, but are not limited to, those identified above in connection with promoting the reaction between the isocyanate and polyol compounds for producing the prepolymer or between prepolymer and chain-extender during the chain-extending step.

The hydroxyl chain-extending (curing) agents are preferably selected from the same group identified above in connection with polyurethane compositions.

Suitable amine chain-extending (curing) agents that can be used in chain-extending the polyurea prepolymer of this invention include, but are not limited to those identified above in connection with chain-extending the polyurethane prepolymer, as well as 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis (3-aminopropoxy)butane (i.e., 3,3'-[1,4-butanediylbis-(oxy) bis]-1-propanamine), diethyleneglycol-bis(propylamine) (i.e., diethyleneglycol-di(aminopropyl)ether), 4,7,10-trioxatridecane-1,13-diamine, 1-methyl-2,6-diamino-cyclohexane, 1,4-diamino-cyclohexane, poly(oxyethylene-oxypropylene) diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane,
polyoxypropylene diamines, 3,3'-diethyl-5,5'-dichloro-4,4'-diamino-dicyclohexylmethane, polytetramethylene ether diamines, 3,3',5,5'-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated).

When the polyurea prepolymer is reacted with amine-terminated curing agents during the chain-extending step, as described above, the resulting composition is essentially a pure polyurea composition. On the other hand, when the polyurea prepolymer is reacted with a hydroxyl-terminated curing agent during the chain-extending step, any excess isocyanate groups in the prepolymer will react with the hydroxyl groups in the curing agent and create urethane linkages to form a polyurea-urethane hybrid. Herein, the terms urea and polyurea are used interchangeably.

This chain-extending step, which occurs when the polyurea prepolymer is reacted with hydroxyl curing agents, amine curing agents, or mixtures thereof, builds-up the molecular weight and extends the chain length of the prepolymer. When the polyurea prepolymer is reacted with amine curing agents, a polyurea composition having urea linkages is produced. When the polyurea prepolymer is reacted with hydroxyl curing agents, a polyurea/urethane hybrid composition containing both urea and urethane linkages is produced. The polyurea/urethane hybrid composition is distinct from the pure polyurea composition. The concentration of urea and urethane linkages in the hybrid composition may vary. In general, the hybrid composition may contain a mixture of about 10 to 90% urea and about 90 to 10% urethane linkages. The resulting polyurea or polyurea/urethane hybrid composition has elastomeric properties based on phase separation of the soft and hard segments. The soft segments, which are formed from the polyamine reactants, are generally flexible and mobile, while the hard segments, which are formed from the isocyanates and chain extenders, are generally stiff and immobile.

The method of the invention is ideal for dimpling an outer cover layer being formed about and adjacent to an inner layer such as a casing layer, intermediate layer, and/or an inner cover layer that is comprised of a material which could soften and deform and/or migrate into adjacent layers during over-molding of the thermoplastic outer cover layer thereabout via conventional molding processes. Such materials include but are not limited to ionomers (e.g. Surlyn®, HNPs, etc.) and blends thereof.

The ionomer may include, for example, partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers.

Ionomers, typically are ethylene/acrylic acid copolymers or ethylene/acrylic acid/acrylate terpolymers in which some or all of the acid groups are neutralized with metal cations such as na, li, mg, and/or zn. Non-limiting examples of commercially available ionomers suitable for use with the present invention include for example SURLYNs® from DuPont and Ioteks® from Exxon. SURLYN® 8940 (Na), SURLYN® 9650 (Zn), and SURLYN® 9910 (Zn) are examples of low acid ionomer resins with the acid groups that have been neutralized to a certain degree with a cation. More examples of suitable low acid ionomers, e.g., Escor® 4000/7030 and Escor® 900/8000, are disclosed in U.S. Pat. Nos. 4,911,451 and 4,884,814, the disclosures of which are incorporated by reference herein. High acid ionomer resins include SURLYN(® 8140 (Na) and SURLYN® 8546 (Li), which have an methacrylic acid content of about 19 percent. The acid groups of these high acid ionomer resins that have been neutralized to a certain degree with the designated cation.

Ionomers may encompass those polymers obtained by copolymerization of an acidic or basic monomer, such as alkyl (meth)acrylate, with at least one other comonomer, such as an olefin, styrene or vinyl acetate, followed by at least partial neutralization. Alternatively, acidic or basic groups may be incorporated into a polymer to form an ionomer by reacting the polymer, such as polystyrene or a polystyrene copolymer including a block copolymer of polystyrene, with a functionality reagent, such as a carboxylic acid or sulfonic acid, followed by at least partial neutralization. Suitable neutralizing sources include cations for negatively charged acidic groups and anions for positively charged basic groups.

For example, ionomers may be obtained by providing a cross metallic bond to polymers of monoolefin with at least one member selected from the group consisting of unsaturated mono- or di-carboxylic acids having 3 to 12 carbon atoms and esters thereof (the polymer contains about 1 percent to about 50 percent by weight of the unsaturated mono- or di-carboxylic acid and/or ester thereof). In one embodiment, the ionomer is an E/X/Y copolymers where E is ethylene, X is a softening comonomer, such as acrylate or methacrylate, present in 0 percent to about 50 percent by weight of the polymer (preferably 0 weight percent to about 25 weight percent, most preferably 0 weight percent to about 20 weight percent), and Y is acrylic or methacrylic acid present in about 5 to about 35 weight percent of the polymer, wherein the acid moiety is neutralized about 1 percent to about 100 percent (preferably at least about 40 percent, most preferably at least about 60 percent) to form an ionomer by a cation such as lithium, sodium, potassium, magnesium, calcium, barium, lead, tin, zinc, or aluminum, or a combination of such cations.

Any of the acid-containing ethylene copolymers discussed above may be used to form an ionomer according to the present invention. In addition, the ionomer may be a low acid or high acid ionomer. As detailed above, a high acid ionomer may be a copolymer of an olefin, e.g., ethylene, and at least 16 weight percent of an α,β-ethylenically unsaturated carboxylic acid, e.g., acrylic or methacrylic acid, wherein about 10 percent to about 100 percent of the carboxylic acid groups are neutralized with a metal ion. In contrast, a low acid ionomer contains about 15 weight percent of the α,β-ethylenically unsaturated carboxylic acid.

Suitable commercially available ionomer resins include SURLYNs® (DuPont) and Ioteks® (Exxon). Other suitable ionomers for use in the blends of the present invention include polyolefins, polyesters, polystyrenes, SBS, SEBS, and polyurethanes, in the form of homopolymers, copolymers, or block copolymer ionomers.

The ionomers may also be blended with highly neutralized polymers (HNP). As used herein, a highly neutralized polymer has greater than about 70 percent of the acid groups neutralized. In one embodiment, about 80 percent or greater of the acid groups are neutralized. In another embodiment, about 90 percent or greater of the acid groups are neutralized. In still another embodiment, the HNP is a fully neutralized polymers, i.e., all of the acid groups (100 percent) in the polymer composition are neutralized.

Suitable HNPs include, but are not limited to, polymers containing α,β-unsaturated carboxylic acid groups, or the salts thereof, that have been highly neutralized by organic fatty acids. Such HNPs are commercially available from DuPont under the trade name HPF, e.g., HPF 1000 and HPF 2000. The HNP can also be formed using an oxa-containing compound as a reactive processing aid to avoid processing problems, as disclosed in U.S. Patent Publication No. 2003/0225197. In particular, an HNP can include a thermoplastic resin component having an acid or ionic group, i.e., an acid polymer or partially neutralized polymer, combined with an oxa acid, an oxa salt, an oxa ester, or combination thereof and an inorganic metal compound or organic amine compound. As used herein, a partially neutralized polymer should be understood to mean polymers with about 10 to about 70 percent of the acid groups neutralized. For example, the HNP can includes about 10 percent to about 30 percent by weight of at least one oxa acid, about 70 percent to about 90 percent by weight of at least one thermoplastic resin component, and about 2 percent to about 6 percent by weight of an inorganic metal compound, organic amine, or a combination thereof.

In addition, the HNP can be formed from an acid copolymer that is neutralized by one or more amine-based or ammonium-based components, or mixtures thereof, as disclosed in co-pending U.S. patent application Ser. No. 10/875,725, filed Jun. 25, 2004, entitled "Golf Ball Compositions Neutralized with Ammonium-Based and Amine-Based Compounds," which is incorporated in its entirety by reference herein.

Furthermore, those of ordinary skill in the art will appreciate that the HNPs may be neutralized using one or more of the above methods. For example, an acid copolymer that is partially or highly neutralized in a manner described above may be subjected to additional neutralization using more traditional processes, e.g., neutralization with salts of organic fatty acids and/or a suitable cation source.

In a particular embodiment, the core includes at least one additional thermoplastic intermediate core layer formed from a composition comprising an ionomer selected from DuPont® HPF ESX 367, HPF 1000, HPF 2000, HPF AD1035, HPF AD1035 Soft, HPF AD1040, and AD1172 ionomers, commercially available from E. I. du Pont de Nemours and Company. The coefficient of restitution ("COR"), compression, and surface hardness of each of these materials, as measured on 1.55" injection molded spheres aged two weeks at 23° C./50% RH, are given in Table 9 below.

TABLE 9

| Example | Solid Sphere COR | Solid Sphere Compression | Solid Sphere Shore D Surface Hardness |
| --- | --- | --- | --- |
| HPF 1000 | 0.830 | 115 | 54 |
| HPF 2000 | 0.860 | 90 | 47 |
| HPF AD1035 | 0.820 | 63 | 42 |
| HPF AD1035 Soft | 0.780 | 33 | 35 |
| HPF AD1040 | 0.855 | 135 | 60 |
| HPF AD1172 | 0.800 | 32 | 37 |

In one embodiment, an intermediate layer is disposed between the single or multi-layered core and surrounding cover layer. These intermediate layers also can be referred to as casing or inner cover layers. The intermediate layer can be formed from any materials known in the art, including thermoplastic and thermosetting materials, but preferably is formed of an ionomer composition comprising an ethylene acid copolymer containing acid groups that are at least partially neutralized. Suitable ethylene acid copolymers that may be used to form the intermediate layers are generally referred to as copolymers of ethylene; $C_3$ to $C_8$ α, β-ethylenically unsaturated mono- or dicarboxylic acid; and optional softening monomer. These ethylene acid copolymer ionomers also can be used to form the inner core and outer core layers as described above.

Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized. Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α,β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Other suitable thermoplastic polymers that may be used to form the adjacent casing, intermediate and/or inner cover layer, but are not limited to, the following polymers (including homopolymers, copolymers, and derivatives thereof: (a) polyester, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof; (b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof; (c) polyurethanes, polyureas, polyurethane-polyurea hybrids, and blends of two or more thereof; (d) fluoropolymers, such as those disclosed in U.S. Pat. Nos. 5,691,066, 6,747,110 and 7,009,002, the entire disclosures of which are hereby incorporated herein by reference, and blends of two or more thereof; (e) polystyrenes, such as poly(styrene-co-maleic anhydride), acrylonitrile-butadiene-styrene, poly(styrene sulfonate), polyethylene styrene, and blends of two or more thereof; (f) polyvinyl chlorides and grafted polyvinyl chlorides, and blends of two or more thereof; (g) polycarbonates, blends of polycarbonate/acrylonitrile-butadiene-styrene, blends of polycarbonate/polyurethane, blends of polycarbonate/polyester, and blends of two or more thereof; (h) polyethers, such as polyarylene ethers, polyphenylene oxides, block copolymers of alkenyl aromatics with vinyl aromatics and polyamicesters, and blends of two or more thereof; (i) polyimides, polyetherketones, polyamideimides, and blends of two or more thereof; and (j) polycarbonate/polyester copolymers and blends.

Inventive golf balls having various constructions may be made in accordance with the method of this invention, with a limitation being that at least one layer of the golf ball incorporates a cured elastomeric material comprised of comprising a mixture of an elastomeric composition and an organic peroxide-based curing composition; wherein the mixture at least partially contacts oxygen during curing and as further defined herein.

Golf balls of the invention may therefore have two piece, three piece, four-piece, and five-piece constructions with single or multi-layered cores, and/or single or multi-layered casing layers/intermediate layers, and single or multi-layered covers.

Representative illustrations of such golf ball constructions are provided and discussed further below. The term, "layer" as used herein means generally any spherical of the golf ball. More particularly, in one version, a two-piece golf ball containing a core surrounded by a cover is made. Three-piece golf balls containing a dual-layered core and single-layered cover also can be made. The dual-core includes an inner core (center) and surrounding outer core layer. In another version, a four-piece golf ball containing a dual-core and dual-cover (inner cover and outer cover layers) is made. In yet another construction, a four-piece or five-piece golf ball containing a dual-core; casing layer(s); and cover layer(s) may be made. As used herein, the term, "casing layer" means a layer of the ball disposed between the multi-layered core sub-assembly and cover. The casing layer also may be referred to as a mantle or intermediate layer. The diameter and thickness of the different layers along with properties such as hardness and compression may vary depending upon the construction and desired playing performance properties of the golf ball as discussed further below.

Thus, golf balls of the invention may have any number of layers, including for example a four piece golf ball wherein the core is a dual core surrounded by an ionomeric inner cover layer wherein an outer cover layer is a thermoplastic polyurethane disposed about the inner cover layer. In such embodiments, it is envisioned that the inner core may comprise a thermoset composition or a thermoplastic composition while the outer core layer may be formed from either of a thermoset composition or a thermoplastic composition. And the outer cover layer may consist of numerous possible variations and combinations of thermoplastic polymer(s) such as those disclosed herein. Outer cover hardnesses may range from 20 shore D to 70 Shore D, although it is envisioned that the dimpled outermost cover layer material can be targeted within any known range by modifying the ingredients of the thermoplastic polymer and relative amounts thereof, as well as by modifying the processing time and temperature.

In a particular embodiment, the golf ball has a diameter of greater than 1.682 inches and is comprised of a polybutadiene-based core, an ionomer casing layer and a thermoplastic polyurethane outer cover layer that was formed about the casing layer via RPIM in advance of providing dimples on the cover outer surface via the method of the invention. In still other embodiments, the golf ball has a diameter of greater than 1.69 inches, or a diameter of 1.710 inches or greater.

As discussed above, single and multi-layered cores can be made in accordance with this invention. In two-layered cores, a thermoset material such as, for example, thermoset rubber, can be used to make the outer core layer or a thermoplastic material such as, for example, ethylene acid copolymer containing acid groups that are at least partially or fully neutralized can be used to make the outer core layer. Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. Suitable ethylene acid copolymer ionomers and other thermoplastics that can be used to form the core layer(s) are the same materials that can be used to make an inner cover layer as discussed further below.

In another example, multi-layered cores having an inner core, intermediate core layer, and outer core layer, wherein the intermediate core layer is disposed between the intermediate and outer core layers may be prepared in accordance with this invention. More particularly, as discussed above, the inner core may be constructed from a thermoplastic or thermoset composition, such as thermoset rubber. Meanwhile, the intermediate and outer core layers also may be formed from thermoset or thermoplastic materials. Suitable thermoset and thermoplastic compositions that may be used to form the intermediate/outer core layers are discussed above. For example, each of the intermediate and outer core layers may be formed from a thermoset rubber composition. Thus, the intermediate core layer may be formed from a first thermoset rubber composition; and the outer core layer may be formed from a second thermoset rubber composition. In another embodiment, the intermediate core layer is formed from a thermoset composition; and the outer core layer is formed from a thermoplastic composition. In a third embodiment, the intermediate core layer is formed from a thermoplastic composition; and the outer core layer is formed from a thermoset composition. Finally, in a fourth embodiment, the intermediate core layer is formed from a first thermoplastic composition; and the outer core layer is formed from a second thermoplastic compositions.

The cover may have a wide range of different hardnesses including any of those currently known in the golf ball art including but not limited to a range of from about 20 Shore D to about 70 Shore D.

Covers of the golf ball may be formed about the subassembly using any suitable method as described further below. Prior to forming the cover layers, the ball sub-assembly may be surface-treated to increase the adhesion between its outer surface and the overlying cover material using the above-described techniques.

The invention also relates to a golf ball made by a method of the invention. In one embodiment, the subassembly comprises a core surrounded by an inner cover layer. In a specific such embodiment, the core is a single core. In another specific such embodiment, the core comprises an inner core surrounded by an outer core layer.

In a golf ball of the invention made by a method of the invention, conventional compression and injection-molding and other methods can be used to pre-mold cover layers over the core or ball sub-assembly with at least one modification being that the molds will have smooth inner surfaces rather than having a dimple pattern contoured inner surface. In general, compression molding normally involves first making half (hemispherical) shells by injection-molding the composition in an injection mold. This produces semi-cured, semi-rigid half-shells (or cups). Then, the half-shells are positioned in a compression mold around the core or ball sub-assembly. Heat and pressure are applied and the half-shells fuse together to form a cover layer over the core or sub-assembly. Compression molding also can be used to cure the cover composition after injection-molding. For example, a thermally-curable composition can be injection-molded around a core in an unheated mold. After the composition is partially hardened, the ball is removed and placed in a compression mold. Heat and pressure are applied to the ball and this causes thermal-curing of the outer cover layer.

Retractable pin injection-molding (RPIM) methods generally involve using upper and lower mold cavities that are mated together. The upper and lower mold cavities form a spherical interior cavity when they are joined together. The mold cavities used to form the outer cover layer have the usual interior dimple cavity details. The cover material conforms to the interior geometry of the mold cavities to form a dimple pattern on the surface of the ball. The injection-mold includes retractable support pins positioned throughout the mold cavities. The retractable support pins move in and out of the cavity. The support pins help maintain the position of the core or ball sub-assembly while the molten composition flows through the mold gates. The molten composition flows into the cavity between the core and mold cavities to surround the core and form the cover layer. Other methods can be used to make the cover including, for example, reaction injection-molding (RIM), liquid injection-molding, casting, spraying, powder-coating, vacuum-forming, flow-coating, dipping, spin-coating, and the like.

As discussed above, an inner cover layer or intermediate layer, preferably formed from an ethylene acid copolymer ionomer composition, can be part of the subassembly. The layer comprising ionomer may be an outermost layer of the subassembly and adjacent the thermoplastic cover. This layer may be formed using conventional technique such as, for example, compression or injection-molding. For example, the ionomer composition may be injection-molded or placed in a compression mold to produce half-shells. These shells are placed around the core in a compression mold, and the shells fuse together to form an intermediate layer. Alternatively, the ionomer composition is injection-molded directly onto the core using retractable pin injection-molding.

After the golf balls have been removed from the mold, they may be dimpled as described herein followed by being subjected to any necessary finishing steps such as flash-trimming or surface-treatment, each which should be reduced, or marking, and/or providing any desired coating layer which may be applied via methods such as spraying, dipping, brushing, or rolling. Then the golf ball can go through a series of finishing steps as also desired.

For example, in traditional white-colored golf balls, the white-pigmented outer cover layer may be surface-treated using a suitable method such as, for example, corona, plasma, or ultraviolet (UV) light-treatment. In another finishing process, the golf balls are painted with one or more paint coatings. For example, white or clear primer paint may be applied first to the surface of the ball and then indicia may be applied over the primer followed by application of a clear polyurethane top-coat. Indicia such as trademarks, symbols, logos, letters, and the like may be printed on the outer cover or prime-coated layer, or top-coated layer using pad-printing, ink-jet printing, dye-sublimation, or other suitable printing methods. Any of the surface coatings may contain a fluorescent optical brightener.

The golf balls produced by a method of this invention provide a variety of advantageous mechanical and playing performance properties as discussed further below. In general, the hardness, diameter, and thickness of the different ball layers may vary depending upon the desired ball construction. Thus, golf balls produced by a method of the invention may have any known overall diameter and any known number of different layers and layer thicknesses, wherein a thermoplastic material is incorporated in the cover in order to target desired playing characteristics.

For example, the core may have a diameter ranging from about 0.09 inches to less than about 1.7 inches. In one embodiment, the diameter of the core of the present invention is about 1.2 inches to about 1.630 inches. When part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

In some embodiments, the core may have an overall diameter within a range having a lower limit of 0.500 or 0.700 or 0.750 or 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 inches and an upper limit of 1.620 or 1.630 or 1.640 inches or less than 1.7 inches. In a particular embodiment, the core is a multi-layer core having an overall diameter within a range having a lower limit of 0.500 or 0.700 or 0.750 or 0.800 or 0.850 or 0.900 or 0.950 or 1.000 or 1.100 or 1.150 or 1.200 inches and an upper limit of 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter within a range having a lower limit of 0.500 or 0.700 or 0.750 inches and an upper limit of 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 or 1.620 or 1.630 or 1.640 inches or about 1.7 inches. In another particular embodiment, the multi-layer core has an overall diameter of 1.500 inches or 1.510 inches or 1.530 inches or 1.550 inches or 1.570 inches or 1.580 inches or 1.590 inches or 1.600 inches or 1.610 inches or 1.620 inches.

In some embodiments, the inner core can have an overall diameter of 0.500 inches or greater, or 0.700 inches or greater, or 1.00 inches or greater, or 1.250 inches or greater, or 1.350 inches or greater, or 1.390 inches or greater, or 1.450 inches or greater, or an overall diameter within a range having a lower limit of 0.250 or 0.500 or 0.750 or 1.000 or 1.250 or 1.350 or 1.390 or 1.400 or 1.440 inches and an upper limit of 1.460 or 1.490 or 1.500 or 1.550 or 1.580 or 1.600 inches, or an overall diameter within a range having a lower limit of 0.250 or 0.300 or 0.350 or 0.400 or 0.500 or 0.550 or 0.600 or 0.650 or 0.700 inches and an upper limit of 0.750 or 0.800 or 0.900 or 0.950 or 1.000 or 1.100 or 1.150 or 1.200 or 1.250 or 1.300 or 1.350 or 1.400 inches.

In some embodiments, the outer core layer can have an overall thickness within a range having a lower limit of 0.010 or 0.020 or 0.025 or 0.030 or 0.035 inches and an upper limit of 0.040 or 0.070 or 0.075 or 0.080 or 0.100 or 0.150 inches, or an overall thickness within a range having a lower limit of 0.025 or 0.050 or 0.100 or 0.150 or 0.160 or 0.170 or 0.200 inches and an upper limit of 0.225 or 0.250 or 0.275 or 0.300 or 0.325 or 0.350 or 0.400 or 0.450 or greater than 0.450 inches. The outer core layer may alternatively have a thickness of greater than 0.10 inches, or 0.20 inches or greater, or greater than 0.20 inches, or 0.30 inches or greater, or greater than 0.30 inches, or 0.35 inches or greater, or greater than 0.35 inches, or 0.40 inches or greater, or greater than 0.40 inches, or 0.45 inches or greater, or greater than 0.45 inches, or a thickness within a range having a lower limit of 0.005 or 0.010 or 0.015 or 0.020 or 0.025 or 0.030 or 0.035 or 0.040 or 0.045 or 0.050 or 0.055 or 0.060 or 0.065 or 0.070 or 0.075 or 0.080 or 0.090 or 0.100 or 0.200 or 0.250 inches and an upper limit of 0.300 or 0.350 or 0.400 or 0.450 or 0.500 or 0.750 inches.

An intermediate core layer can have any known overall thickness such as within a range having a lower limit of 0.005 or 0.010 or 0.015 or 0.020 or 0.025 or 0.030 or 0.035 or 0.040 or 0.045 inches and an upper limit of 0.050 or 0.055 or 0.060 or 0.065 or 0.070 or 0.075 or 0.080 or 0.090 or 0.100 inches.

The cores and core layers of golf balls of the invention may have varying hardnesses depending on the particular golf ball construction and playing characteristics being targeted. Core center and/or layer hardness can range, for example, from 35 Shore C to about 98 Shore C, or 50 Shore C to about 90 Shore C, or 60 Shore C to about 85 Shore C, or 45 Shore C to about 75 Shore C, or 40 Shore C to about 85 Shore C. In other embodiments, core center and/or layer hardness can range, for example, from about 20 Shore D to about 78 Shore D, or from about 30 Shore D to about 60 Shore D, or from about 40 Shore D to about 50 Shore D, or 50 Shore D or less, or greater than 50 Shore D.

The compression of the core is generally overall in the range of about 40 to about 110, although embodiments are envisioned wherein the compression of the core is as low as 5. In other embodiments, the overall CoR of cores of the present invention at 125 ft/s is at least 0.750, or at least 0.775 or at least 0.780, or at least 0.785, or at least 0.790, or at least 0.795, or at least 0.800. Cores are also known to comprise rubbers and also may be formed of a variety of other materials that are typically also used for intermediate and cover layers. Intermediate layers may likewise also comprise materials generally used in cores and covers as described herein for example.

An intermediate layer is sometimes thought of as including any layer(s) disposed between the inner core (or center) and the outer cover of a golf ball, and thus in some embodiments, the intermediate layer may include an outer core layer, a casing layer, or inner cover layer(s). In this regard, a golf ball of the invention may include one or more intermediate layers. An intermediate layer may be used, if desired, with a multilayer cover or a multilayer core, or with both a multilayer cover and a multilayer core.

In one non-limiting embodiment, an intermediate layer having a thickness of about 0.010 inches to about 0.06 inches, is disposed about a core having a diameter ranging from about 1.5 inches to about 1.59 inches.

Intermediate layer(s) may be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly (ether-amide), polyphenylene oxide resins or blends thereof, and thermoplastic polyesters. However, embodiments are envisioned wherein at least one intermediate layer is formed from a different material commonly used in a core and/or cover layer.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.010 inches to about 0.06 inches. In another embodiment, the intermediate layer thickness is about 0.05 inches or less, or about 0.01 inches to about 0.045 inches for example.

If the ball includes an intermediate layer or inner cover layer, the hardness (material) may for example be about 50 Shore D or greater, more preferably about 55 Shore D or greater, and most preferably about 60 Shore D or greater. In one embodiment, the inner cover has a Shore D hardness of about 62 to about 90 Shore D. In one example, the inner cover has a hardness of about 68 Shore D or greater. In addition, the thickness of the inner cover layer is preferably about 0.015 inches to about 0.100 inches, more preferably about 0.020 inches to about 0.080 inches, and most preferably about 0.030 inches to about 0.050 inches, but once again, may be changed to target playing characteristics.

The cover typically has a thickness to provide sufficient strength, good performance characteristics, and durability. In one embodiment, the cover thickness may for example be from about 0.02 inches to about 0.12 inches, or about 0.1 inches or less. For example, the cover may be part of a two-piece golf ball and have a thickness ranging from about 0.03 inches to about 0.09 inches. In another embodiment, the cover thickness may be about 0.05 inches or less, or from about 0.02 inches to about 0.05 inches, or from about 0.02 inches and about 0.045 inches.

The cover may be a single-, dual-, or multi-layer cover and have an overall thickness for example within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. Ina particular embodiment, the cover may be a single layer having a thickness of from 0.010 or 0.020 or 0.025 inches to 0.035 or 0.040 or 0.050 inches. In another particular embodiment, the cover may consist of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

The outer cover preferably has a thickness within a range having a lower limit of about 0.004 or 0.010 or 0.020 or 0.030 or 0.040 inches and an upper limit of about 0.050 or 0.055 or 0.065 or 0.070 or 0.080 inches. Preferably, the thickness of the outer cover is about 0.020 inches or less. The outer cover preferably has a surface hardness of 75 Shore D or less, 65 Shore D or less, or 55 Shore D or less, or 50 Shore D or less, or 50 Shore D or less, or 45 Shore D or less. Preferably, the outer cover has hardness in the range of about 20 to about 70 Shore D. In one example, the outer cover has hardness in the range of about 25 to about 65 Shore D.

In one embodiment, the cover may be a single layer having a surface hardness for example of 60 Shore D or greater, or 65 Shore D or greater. In a particular aspect of this embodiment, the cover is formed from a composition having a material hardness of 60 Shore D or greater, or 65 Shore D or greater.

In another particular embodiment, the cover may be a single layer having a thickness of from 0.010 or 0.020 inches to 0.035 or 0.050 inches and formed from a composition having a material hardness of from 60 or 62 or 65 Shore D to 65 or 70 or 72 Shore D.

In yet another particular embodiment, the cover is a single layer having a thickness of from 0.010 or 0.025 inches to 0.035 or 0.040 inches and formed from a composition having a material hardness of 62 Shore D or less, or less than 62 Shore D, or 60 Shore D or less, or less than 60 Shore D, or 55 Shore D or less, or less than 55 Shore D.

In still another particular embodiment, the cover is a single layer having a thickness of from 0.010 or 0.025 inches to 0.035 or 0.040 inches and formed from a composition having a material hardness of 62 Shore D or less, or less than 62 Shore D, or 60 Shore D or less, or less than 60 Shore D, or 55 Shore D or less, or less than 55 Shore D.

In an alternative embodiment, the cover may comprise an inner cover layer and an outer cover layer. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In yet another embodiment, the cover is a dual- or multi-layer cover including an inner or intermediate cover layer and an outer cover layer. The inner cover layer may have a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer may have a material hardness of 65 Shore D or less, or 55 Shore D or less, or 45 Shore D or less, or 40 Shore D or less, or from 25 Shore D to 40 Shore D, or from 30 Shore D to 40 Shore D. The outer cover layer may have a surface hardness within a range having a lower limit of 20 or 30 or 35 or 40 Shore D and an upper limit of 52 or 58 or 60 or 65 or 70 or 72 or 75 Shore D. The outer cover layer may have a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

All this being said, embodiments are also envisioned wherein one or more of the cover layers is formed from a material typically incorporated in a core or intermediate layer especially one that would present the aforementioned problems when dimpled such as displacing the material of the adjacent inner layer.

It is envisioned that golf balls of the invention may also incorporate conventional coating layer(s) for the purposes usually incorporated. For example, one or more coating layer may have a combined thickness of from about 0.1 m to about 100 m, or from about 2 m to about 50 m, or from about 2 m to about 30 m. Meanwhile, each coating layer may have a thickness of from about 0.1 m to about 50 m, or from about 0.1 m to about 25 m, or from about 0.1 m to about 14 m, or from about 2 m to about 9 m, for example.

The resulting balls of this invention have good impact durability and cut/shear-resistance. The United States Golf Association ("USGA") has set total weight limits for golf balls. Particularly, the USGA has established a maximum weight of 45.93 g (1.62 ounces) for golf balls. There is no lower weight limit. In addition, the USGA requires that golf balls used in competition have a diameter of at least 1.68 inches. There is no upper limit so many golf balls have an overall diameter falling within the range of about 1.68 to about 1.80 inches. The golf ball diameter is preferably about 1.68 to 1.74 inches, more preferably about 1.68 to 1.70 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches.

Preferably, the golf ball has a Coefficient of Restitution (CoR) of at least 0.750 and more preferably at least 0.800 (as measured per the test methods below). The core of the golf ball generally has a compression in the range of about 30 to about 130 and more preferably in the range of about 70 to about 110 (as measured per the test methods below.) These properties allow players to generate greater ball velocity off the tee and achieve greater distance with their drives. At the same time, the relatively thin outer cover layer means that a player will have a more comfortable and natural feeling when striking the ball with a club. The ball is more playable and its flight path can be controlled more easily. This control allows the player to make better approach shots near the green. Furthermore, the outer covers of this invention have good impact durability and mechanical strength.

The following test methods may be used to obtain or determine certain properties in connection with materials of golf balls constructed in accordance with a method of the invention.

Hardness

The center hardness of a core is obtained according to the following procedure. The core is gently pressed into a hemispherical holder having an internal diameter approximately slightly smaller than the diameter of the core, such that the core is held in place in the hemispherical of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90 apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D or Shore A hardness) was measured according to the test method ASTM D-2240.

Compression

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core x amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Coefficient of Restitution ("CoR")

The CoR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The CoR is then calculated as the ratio of the ball's outgoing transit time period to the ball's incoming transit time period ($CoR=V_{out}/V_{in}=T_{in}/T_{out}$).

Thermoset and thermoplastic layers herein may be treated in such a manner as to create a positive or negative hardness gradient within and between golf ball layers. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No.

12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

It is understood that the inventive golf balls made by a method of the invention as described and illustrated herein, represent only some of the many embodiments of the invention. It is appreciated by those skilled in the art that various changes and additions can be made to such golf balls without departing from the spirit and scope of this invention. It is intended that all such embodiments be covered by the appended claims.

A golf ball of the invention may further incorporate indicia, which as used herein, is considered to mean any symbol, letter, group of letters, design, or the like, that can be added to the dimpled surface of a golf ball.

Golf balls of the present invention will typically have dimple coverage of 60% or greater, preferably 65% or greater, and more preferably 75% or greater. It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL), for example.

In any of these embodiments the single-layer core may be replaced with a two or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

It is understood that the manufacturing methods, compositions, constructions, and products described and illustrated herein represent only some embodiments of the invention. It is appreciated by those skilled in the art that various changes and additions can be made to compositions, constructions, and products without departing from the spirit and scope of this invention. It is intended that all such embodiments be covered by the appended claims.

What is claimed is:

1. A golf ball comprising a core and a cover;
   wherein the core has a geometric center and an outer surface, a diameter of from about 1.5 inches to about 1.62 inches, and is comprised of a cured elastomeric composition comprising a mixture of an elastomeric composition and an organic peroxide-based curing composition; wherein the mixture at least partially contacts oxygen during curing;
   wherein the elastomeric composition is selected from the group consisting of: natural rubber, polybutadiene, polyisoprene, ethylene propylene rubber, ethylene-propylene-diene rubber, styrene-butadiene rubber, butyl rubber, halobutyl rubber, polyurethane rubber, polyurea rubber, acrylonitrile butadiene rubber, polychloroprene, alkyl acrylate rubber, chlorinated isoprene rubber, acrylonitrile chlorinated isoprene rubber, polyalkenamer, and combinations thereof;
   wherein the organic peroxide-based curing composition comprises at least one organic peroxide and at least one compound selected from one of three additive groups:
   i) bis-maleimides, tri-maleimides, and poly-maleimides, bis-citraconimides, tri-citraconimides, and poly-citraconimides, and p-phenylenediamine-based antiozonants, sulfur-containing accelerators, polysulfide polymers, and combinations thereof;
   ii) amino acids, folic acid, organic secondary amines, and combinations thereof; or
   iii) sulfur-containing compounds; organophosphite compounds; hindered amine light stabilizer compounds; aliphatic allyl urethane compounds; or tri-blends of nitride-containing compound(s), quinone-containing compound(s), and sulfur-containing compound(s); wherein the blend does not contain any bis-maleimide, tri-maleimide, and poly-maleimide, bis-citraconimide, tri-citraconimide, and poly-citraconimide; and
   wherein the elastomeric composition is comprised of: 100 phr polybutadiene; from about 10 phr to about 50 phr zinc diacrylate; from about 3 phr to about 25 phr zinc oxide; up to 25 phr barium sulfate; from about 0.0 phr to about 2.0 phr antioxidant; from about 0.1 phr to about 5.0 zinc pentachlorothiophenol; and wherein the organic peroxide-based curing composition is included in the mixture in an amount of from about 0.25 phr to about 3.5 phr.

2. The golf ball of claim 1, wherein the organic peroxide-based curing composition is included in the mixture in an amount of at most 2.5 phr.

3. The golf ball of claim 1, wherein the cured elastomer composition comprises a supplemental amount of organic peroxide in addition to an amount of organic peroxide contained in the organic peroxide-based curing composition such that a ratio of amount of organic peroxide-based curing composition to supplemental amount of organic peroxide is form about 7:1 to about 0.5:1.

4. The golf ball of claim 1, wherein the polybutadiene is mixed with up to about 10 phr of at least one other elastomer selected from the group consisting of a different polybutadiene rubber, natural rubber, styrene butadiene rubber, isoprene rubber, and combinations thereof.

5. The golf ball of claim 1, wherein the mixture has an antioxidant to organic peroxide-based curing composition ratio of from about 0.30 to about 5.

6. The golf ball of claim 1, wherein the mixture has a maximum cure temperature of less than 405° F.

7. The golf ball of claim 1, wherein the mixture has a maximum cure temperature of from about 290° F. to about 365° F.

8. The golf ball of claim 1, wherein the mixture has a maximum cure temperature of from 290° F. to about 335° F.

9. The golf ball of claim 1, wherein the mixture has a maximum cure temperature of from 305° F.-320° F.

10. The golf ball of claim 1, wherein the mixture has a maximum cure temperature of greater than 330° F.

11. The golf ball of claim 1, wherein the mixture has a starting cure temperature of about 75° F.-150° F.

12. The golf ball of claim 1, wherein the mixture has a total cure time of about 45 minutes or less.

13. The golf ball of claim 1, wherein the mixture has a total cure time of from about 35 minutes to about 45 minutes.

14. The golf ball of claim 1, wherein the mixture has a total cure time of greater than 25 minutes to about 35 minutes.

15. The golf ball of claim 1, wherein the mixture has a total cure time of from about 10 minutes to about 30 minutes.

16. The golf ball of claim 1, wherein the cured elastomeric composition has a compression set of up to about 30%.

17. The golf ball of claim 1, wherein the cured elastomeric composition has a compression set of 10% or less.

\* \* \* \* \*